Dec. 6, 1927. 1,651,986
C. R. ASHBAUGH
TRACTOR CONTROL DEVICE
Filed Sept. 30, 1925
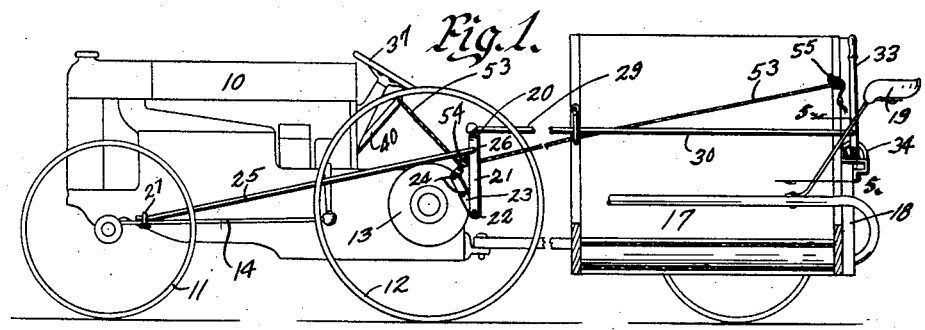
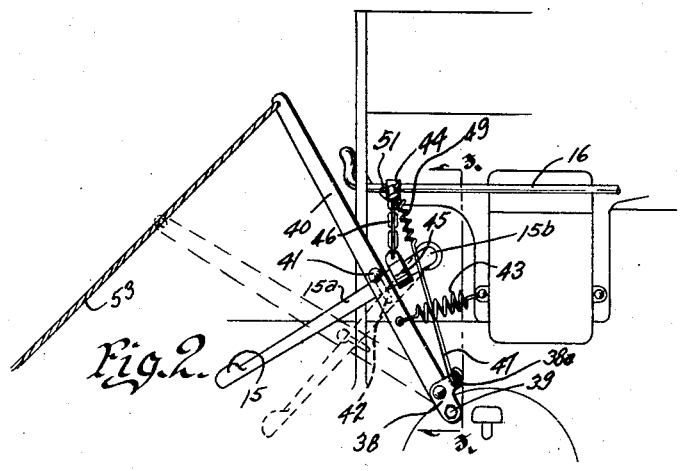 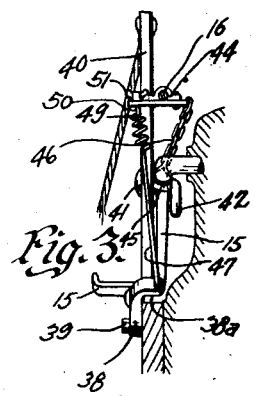
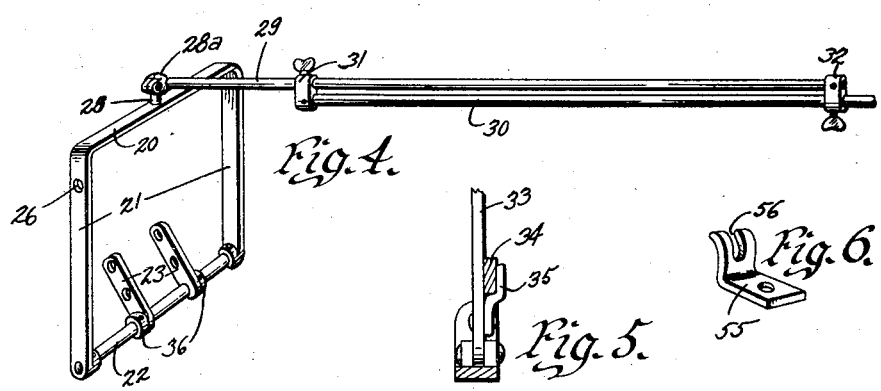
Witness
Ray Rusher
Inventor
Chester R. Ashbaugh
by Bair & Freeman Attorneys.

Patented Dec. 6, 1927.

1,651,986

UNITED STATES PATENT OFFICE.

CHESTER RAY ASHBAUGH, OF ALBERT CITY, IOWA.

TRACTOR-CONTROL DEVICE.

Application filed September 30, 1925. Serial No. 59,550.

The object of my invention is to provide a tractor control device of simple, durable and inexpensive construction, particularly intended and adapted for controlling a Fordson tractor from a binder or other independent machine.

With this and other objects in view, my invention consists in the construction, arrangement and combination of the various parts of my tractor control device, whereby the objects contemplated are attained, as hereinafter more fully set forth, pointed out in my claims, and illustrated in the accompanying drawings, in which:

Figure 1 shows a side elevation of my improved tractor control device installed on a tractor and binder.

Figure 2 is a side elevation of a part of the mechanism viewed from the opposite side.

Figure 3 is a detail, sectional view taken on the line 3—3 of Figure 2.

Figure 4 is a perspective view of part of the tractor control mechanism.

Figure 5 is a sectional view taken on the line 5—5 of Figure 1; and

Figure 6 is a perspective view of the keeper employed with my control mechanism.

In the accompanying drawings, I have used the reference numeral 10 to indicate generally a tractor, preferably of the Fordson type, having the steerable front wheels 11, the rear traction wheels 12, the differential casing 13, and the steering mechanism, including the rod 14.

The tractor has also the foot pedal 15 shown more clearly in Figure 2 for controlling the clutch and the gasoline control rod 16.

I have used the reference numeral 17 to indicate that portion of a binder or the like shown. The binder 17 has the frame 18 and the seat 19.

It is desirable to be able to control the tractor from the binder seat in order that the tractor and independent machine, such as the binder may be operated by one person. My improved control is intended for solving this problem.

My device comprises an inverted U-shaped yoke 20 having the arms 21. At their lower ends, the arms 21 are connected by a cross rod or shaft 22 from which spaced arms 23 are inclined upwardly and forwardly.

The cross rod 22 is arranged just rearwardly of the differential case and the arms 23 are fastened to the differential case by means of bolts 24 screwed into the holes found in the regular tractor structure.

A rod 25 is pivoted to one of the arms 21 in any suitable way as for instance by bending its end at right angles to its main portion and extending the bent end through a hole 26 in such arm 21.

The forward end of the rod 25 is fastened by a U-bolt 27 to the rod 14 which forms part of the ordinary steering mechanism of the Fordson tractor.

A short post 28 extends upwardly from the central portion of the yoke 20 and has a ball on its upper end. Receiving the ball is a socket 28$^a$ secured to the end of the control rod member 29.

A second control rod member 30 is mounted on the rod 29 by means of adjustable clamps 31 and 32 and in such manner as to permit the relative longitudinal adjustment of the rods 29 and 30 for actuating the control mechanism for use with different kinds of independent mechanisms.

The rear end of the rod 30 is pivoted to a lever 33. The lever 33 is pivoted on the frame of the binder 17. Mounted on the frame of the binder 17 adjacent to the lever 30 is a curved bar or the like 34.

On the lever 33 is a finger 35 arranged to engage the curved bar 34 for assisting in holding the lever 33 in proper upright position.

Collars 36 are fixed to the rod 22 outside the respective arms 23 for preventing any longitudinal movement of the rod 22.

It will thus be seen that the operator may sit on the seat 19 and by manipulating the lever 33 may move the rods 30 and 29 backward and forward, thus swinging the yoke 20 and actuating the rod 25 for operating the rod 14 of the steering mechanism in the same manner that the rod 14 is operated from the ordinary steering wheel 37 of the tractor.

It is likewise desirable that the operator on the binder 17 be able to control the clutch and fuel feed of the tractor. For this purpose, I provide the following means:

A small angle bracket 38 is fixed by means of a bolt 39 to the tractor frame. Pivoted to the bracket 38 is a lever 40. Fixed to the lever 40 is a finger or the like 41 having a hook-shaped member 42, which extends over the shank 15$^a$ of the clutch control pedal 15, so that when the lever 40 is pulled rearwardly, the clutch pedal will be depressed and when the lever is permitted to move forwardly, the clutch pedal may rise from its dotted line position shown in Figure 2 to its full line normal position shown in said figure.

During such movements, the hook-shaped portion 42 of the finger 41 slides on the shank 15$^a$. A spring 43 is connected with the lever 40 and the frame of the tractor in such manner as to normally tend to draw the lever in its upright position, as shown in full lines in Figure 2.

In order that the fuel supply may be reduced and the engine throttled down when the lever 40 is actuated to throw out the clutch, I provide the following means:

Fixed on the fuel control rod 16 is a bracket or the like 44, which normally stands in horizontal position, as illustrated in Figure 3, with its ends projecting laterally from the rod 16.

Mounted on the shank 15$^a$ near the crank portion 15$^b$ thereof is a clamp collar 45.

A chain or suitable means 46 connects the clamp collar 45 with one end of the bracket 44. Secured to the inturned end 38$^a$ of the bracket 38 is a rod or the like 47, which is inclined upwardly and is connected at its upper end with the spring 49 which has a straightened end 50 extended through the other end of the bracket 44 and screw-threaded to receive a wing nut 51 by which the tension on the spring 49 may be regulated.

The parts are so constructed and arranged and connected that when the lever 40 is in its upper and forward position shown in full lines in Figure 2 for permitting the clutch pedal 15 to stand in position where the clutch is engaged, the bracket 44 stands in horizontal position. When the bracket 44 is in this position, the fuel control rod 16 is in such position that a proper amount of fuel is furnished to the engine for operating the tractor under load.

When the lever 40 is pulled rearwardly and downwardly, as for instance to its dotted line position shown in Figure 2, the clutch pedal will be depressed and the clutch thrown out.

Simultaneously the clamp collar 45 and chain 46 will move downwardly, swinging the left-hand end of the bracket 44 (see Figure 3) downwardly and the right-hand end thereof upwardly against the tension of the spring 49. This movement will impart rotation to the fuel control rod 16 for reducing the amount of fuel supplied to the engine and thus throttling the engine down. It is obvious that for adaptation to a tractor, the throttle rod 16 of which rotates in an opposite direction to that shown, the bracket 44 may be reversed end for end and the clutch pedal 15 when moving downward will then rotate the rod 16 in the opposite direction.

For controlling the lever 40 from the binder or other independent mechanism, there is connected with the upper end of the lever 40 a rope or the like 53, which is extended around the pulley 54 and thence rearwardly to the binder 17, where it may be fastened in the angle keeper 55 mounted on the binder frame and provided with a notch 56.

The rope 53 may be provided with knots for engaging against the keeper 55 when the clutch pedal is respectively in its upper and in its lower positions.

It will thus be seen that the operator of a machine sitting on the binder may keep his hand on the lever 33 and by manipulating it properly, steer the tractor.

By pulling on the rope 53, the operator throws the tractor out of gear by disengaging the clutch and at the same time rotates the rod 16 for reducing the supply of fuel to the engine.

It is thus possible for one man to operate both the binder and the tractor.

Some changes may be made in the details of the construction and arrangement of the various parts of my improved tractor control without departing from the essential features and purposes of my invention, and it is my intention to cover by my claims any modified forms of structure or use of mechanical equivalents, which may be reasonably included within their scope.

I claim as my invention:

1. In a tractor control structure, a lever adapted to be pivoted to a tractor, a finger adapted to slide along the shank of a clutch control element, and means for yieldingly tending to hold the lever in one position of its movement, means for actuating said lever in another direction from an independent mechanism, a bracket adapted to be fastened to a fuel control rod having projecting ends, means for connecting one of said ends with such clutch control member of the tractor, and a yielding device for connecting the other of said ends with the tractor frame.

2. In a tractor control structure, comprising a lever adapted to be pivoted thereto, a finger adapted to slide along the shank of a clutch control element of the tractor, means for yieldingly tending to hold the lever in one position of its movement, means for actuating said lever in another direction from an independent mechanism, a bracket adapted to be fastened to the fuel control rod of the tractor, means for connecting said brackets with such clutch control member of the tractor, and a yielding device for connecting said bracket with the tractor frame for constraining the bracket toward movement in one direction.

Des Moines, Iowa, September 4, 1925.

CHESTER RAY ASHBAUGH.